US00RE37267E

(19) United States
(12) Reissued Patent
Mosby

(10) Patent Number: US RE37,267 E
(45) Date of Reissued Patent: Jul. 10, 2001

(54) COMBINE HARVESTER WITH SECONDARY CUTTER

(76) Inventor: Ewen Mosby, Box 336, Hartney, Manitoba (CA), R0M 0X0

(21) Appl. No.: 08/897,028

(22) Filed: Jul. 18, 1997

Related U.S. Patent Documents

Reissue of:
(64) Patent No.: 5,433,065
Issued: Jul. 18, 1995
Appl. No.: 08/187,060
Filed: Jan. 27, 1994

(51) Int. Cl.[7] ..... A01D 34/04; A01D 34/10; A01D 57/02; A01D 41/06

(52) U.S. Cl. ..... 56/13.9; 56/14.4; 56/14.5; 56/158; 56/238

(58) Field of Search ..... 56/13.9, 13.6, 56/13.7, 13.8, 14.3, 14.4, 14.5, 153, 158, 238, 63, 14.6

(56) References Cited

U.S. PATENT DOCUMENTS 2,401,513 6/1946 Schmidt .
3,399,517 9/1968 Magee .
3,434,271 3/1969 Gaunt et al. .
3,584,443 6/1971 Bulin .
4,910,946 3/1990 Underwood .

*Primary Examiner*—Robert E. Pezzuto

(74) *Attorney, Agent, or Firm*—Adrian D. Battison

(57) ABSTRACT

A conventional header of a combine is modified by the addition of a second sickle knife positioned rearwardly of the pan of the header. The second sickle knife is mounted on a bar which is connected to a pair of arms extending under the pan to a forward end pivotally mounted just behind the conventional sickle knife of the header. The arms and the second sickle knife can thus pivot upwardly and downwardly and are mounted on suspension springs carried on the frame of the header. A simple drive from the conventional shaft of the header is connected through a belt to a drive wobble box carried on the second sickle knife at a position partway along its length.

27 Claims, 2 Drawing Sheets

COMBINE HARVESTER WITH SECONDARY CUTTER

Matter enclosed in heavy brackets [ ] appears in the original patent but forms no part of this reissue specification; matter printed in italics indicates the additions made by reissue.

BACKGROUND OF THE INVENTION

This invention relates to a combine harvester and particularly to a technique for improving crop throughput rate by reducing the quantity of straw passed through the combine.

A combine harvester generally includes a header which is mounted on a feeder housing, the header including a cutter knife across the front edge for cutting a standing crop. A transport system on the header transports the cut crop to the central feeder housing for transportation through the feeder housing into the combine body. The height of the cutter knife is adjusted relative to the crop by lifting the header vertically on the feeder housing.

The farmer operating the combine attempts to reduce the amount of crop material entering the combine by setting the height of the cutter knife higher on the crop stem to take the head and a reduced amount of the stem or straw. This of course leaves standing straw in the field behind the combine.

This standing straw must be accommodated in the next action on the field, whether that is a single pass tillage system or whether that is a first of several passes of a conventional tilling system. However this next tilling action can become difficult or impractical where the standing straw is of a length generally greater than the spacing between the shanks on the seeding of cultivating system.

These opposing requirements therefore generally obligate the farmer to cut the crop at a longer length of straw fed into the combine than would otherwise be desirable. This of course reduces the combine efficiency and increases combining costs.

An alternative process which has been proposed is that of a carrying out a second action to cut the straw after the combining process is complete. Some farmers carry out this process using a swather in a second cutting simply to cut straw. A chopper specially mounted on the swather can be used to spread the straw or alternatively the swather canvas can be removed to allow the cut straw to fall directly to the ground. This is of course highly inefficient in that it requires an additional pass over the field.

Another technique uses a separate mower to cut the standing straw in a separate action after the combine. For this purpose it has been proposed to use the conventional sickle knife cutting system which can be moved relatively quickly across the field. Alternatively some farmers utilize a rotary mower or a flail mowing system to cut the standing straw. This however involves an additional process involving additional costs and further movement across the field.

At the present time, therefore, the equipment available is generally unsatisfactory.

A proposal has apparently been made for a combine harvesting system used both in Australia and Europe which includes a stripper header. This header, instead of cutting the straw, strips the head of the crop from the straw and uses the combine to operate only upon the heads which have been stripped. Normally this leaves the whole length of the straw standing in the field. In one publication, the details of which are not available, it was proposed to add an additional cutting knife to the combine. However no details of the arrangement were disclosed in the publication. The combine then includes a cutting knife which cuts down the remaining straw.

It is one object of the present invention, therefore, to provide an improved combine harvester which allows the operator to cut the length of the crop carried into the combine body to be selected to provide improved combine operating efficiency.

SUMMARY OF THE INVENTION

According to the invention there is provided a combine harvester comprising a combine body mounted on ground wheels for transportation across the ground, a header at a forward end of the combine body for cutting a standing crop, a feeder housing for supporting the header and for transporting cut crop from the header to the combine body, a first cutting knife across the forward edge of the header and having a length substantially equal to the width of the header for cutting the crop at a position spaced from the ground and along the length of the crop stem leaving a standing crop stem, transport means for transporting the cut crop along the header to the feeder housing, and a second cutter knife having a length substantially equal to that of the first cutter knife mounted on the combine at a position rearwardly of and downwardly of the first cutter knife for cutting the standing crop stem, the second cutting knife being arranged such that the portion of crop stem cut thereby is released to the ground without engaging the transport means.

*The invention therefore provides for conventional types of combine harvester an arrangement of an addition cutting knife suspended on the header of the combine harvester for cutting the crop behind the header. The details of the conventional combine harvester are therefore not important to the present invention as these are well known.*

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
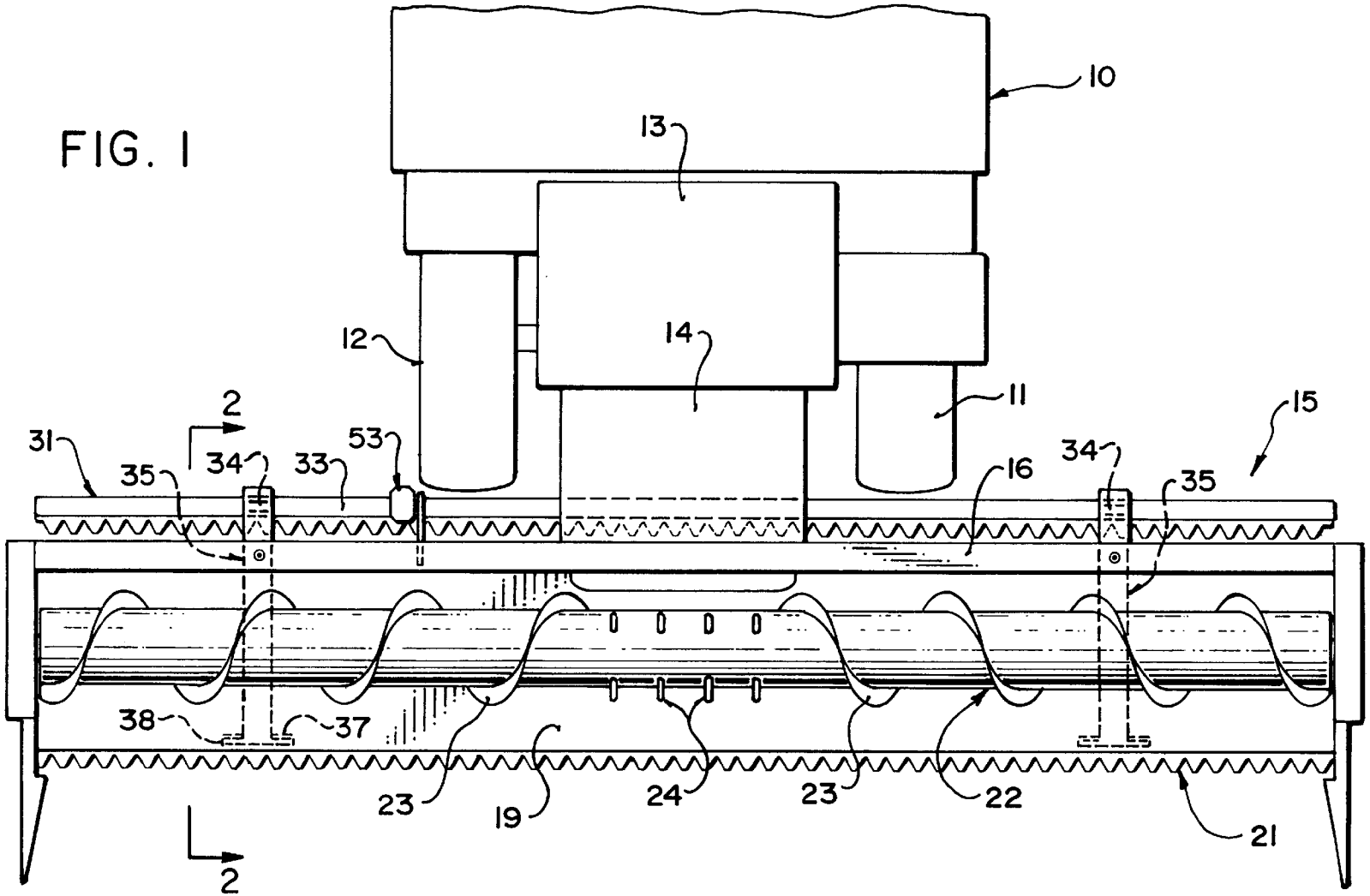
FIG. 1 is a top plan view of a combine harvester according to the invention.
Figure 2:
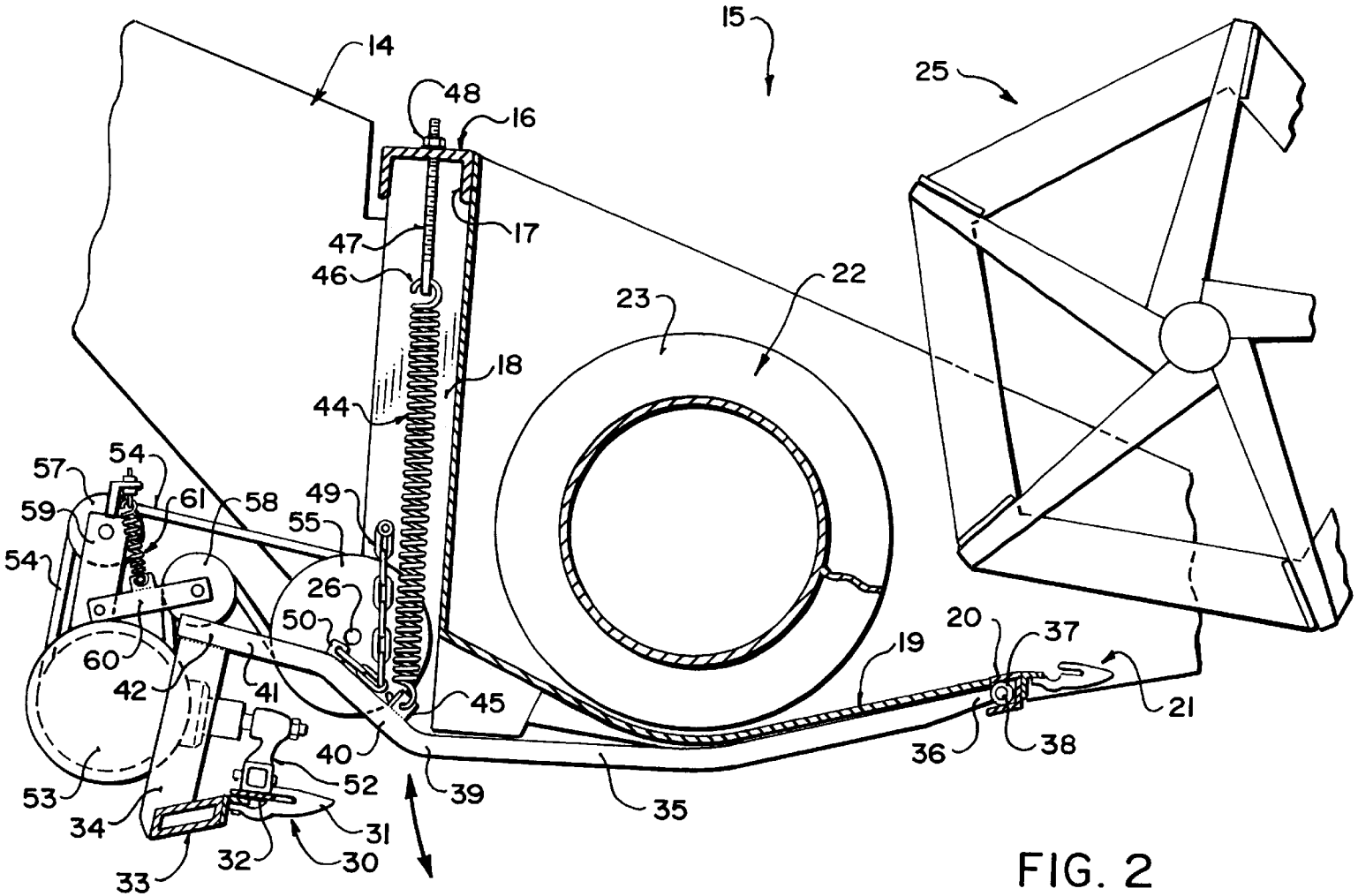
FIG. 2 is a cross sectional view along the lines 2—2 of FIG. 1 on an enlarged scale.

The combine harvester comprises a main combine body 10 mounted on ground wheels 11 and 12 for movement of the body across the ground. The body includes a cab 13. At the forward end of the body is provided a feeder housing 14 which extends forwardly and downwardly from the forward end of the body to support a header generally indicated at 15. The main part of the header as shown in FIGS. 1 and 2 is of a conventional nature and comprises a frame 16 in the form of a main transverse frame beam 17 and a plurality of depending legs 18 at spaced positions along the length of the beam. At the bottom of the vertical legs 18 is provided a forwardly extending generally horizontal pan 19 at the forward end of which is provided a channel 20 extending across the full extent of the forward edge as a support beam for conventional sickle knife 21. On top of the pan 19 is provided an auger flight transport device 22 which rotates about a horizontal axis along the length of the header so as to carry crop material inwardly toward the feeder housing. A flight 23 is provided on the outside surface of the auger 22 for moving the crop and a plurality of retractable fingers 24 are provided on the auger at the feeder housing 14. A reel 25 is also provided on the header just above the sickle knife so as to direct the cut crop rearwardly underneath the auger so that it is carried by the cooperation between the auger and the pan toward the feeder housing.

The sickle knife 21 is driven by a shaft 26 extending along the header rearwardly of the frame toward the bottom of the vertical legs 18. The shaft extends from a drive system centrally of the header outwardly to the two ends and communicates through a belt drive system (not shown) to a wobble box at each end of the sickle knife for reciprocating the knife section of the sickle knife in conventional manner.

The conventional header described above is modified in the present invention by the provision of a secondary cutter knife 30. This knife is positioned rearwardly of the first knife and downwardly of the first knife at a height that can be adjusted so that the standing straw left by the first cutter knife 21 is cut by the second cutter knife at a position downwardly from the top of the standing straw. The cut straw from the second knife falls behind the second knife onto the ground leaving some stubble standing, some straw cut by the second cutter knife and some straw carried with the crop into the combine harvester for processing in the conventional manner.

The various heights of the first cutter knife and the second cutter knife can be controlled relative to the ground and relative to the top of the crop so as to select the required lengths for best efficiency of treatment within the combine and to provide lengths of the standing straw and the cut straw, none of which are of sufficient length of interfere with the proper passage of a cultivator section subsequent to the completion of the combining process.

The cutter knife 30 is of the conventional sickle knife type including a plurality of forwardly extending guards 31 with a blade 32 which slides back and forth across a guide surface of the guards. The guards are mounted on a support bar 33 extending across the full width of the header so that the length of the second cutter knife is substantially equal to that of the first cutter knife and of course equal to the width of the header.

The bar 33 is carried on a pair of depending legs 34 each of which is attached at its lower end to the bar and its upper end to a support arm 35. The support arm 35 extends forwardly from the leg 34 underneath the pan 19 to a forward end 36 thereof which is pivotally mounted within the channel 20. The pivot mounting is provided by a pair of sleeves 37 which receive the ends of a transverse rod welded to the forward end of the arm 35. The arm is shaped so that a first portion thereof from the forward end 36 to a mid point 39 closely follows the shape of the underside of the pan 19. Thus the arm 35 includes a first portion inclined downwardly and rearwardly from the front end 36 and then extends generally horizontally to the position 39 arranged at the rear edge of the pan 19 and at the bottom of the legs 18. From the position 39, the arm is inclined upwardly and rearwardly in a first portion 40 and then in a second portion. 41 extends again upwardly and rearwardly but at a shallower angle. A rear end 42 of the arm at which the top of the leg 34 is attached is thus positioned upwardly of a rear edge of the pan 19 at the bottom of the leg 18. From the rear end 42, the leg extends downwardly and rearwardly to the bar 33. From the lower end of the leg 34, the bar is inclined slightly upwardly so that the angle of the sickle knife is arranged in a plane generally parallel to the plane of the sickle knife 21.

Each arm 35 has associated therewith a vertical tension spring 44 which is coupled to a lug 45 on the arm and extends vertically upwardly therefrom parallel to the leg 18 to an upper hook 46 connected by a bolt 47 to a nut 48 carried on the top of the main beam 17. The spring thus tends to hold some of the weight of the arms and the second cutter knife but is insufficiently tensioned to support the full weight so that the knife moves downwardly under its own weight. This provides a floating action allowing the bar to move readily upward on contact with the ground. A tether 49 in the form of a chain is connected between one of the legs 18 and a lug 50 on top of the arm 35. The chain thus limits the downward movement of the arm to a predetermined amount depending upon the length of the chain. The chain can also be lifted and locked in place to hold the support arms up against the underside of the pan.

The sickle knife 30 is driven by a link 52 of a wobble box 53 mounted at an intermediate point along the length of the sickle knife. The wobble box is driven by a belt 54 wrapped around a drive pulley of the wobble box. The belt is driven by a pulley 55 carried on the shaft 26 and is arranged at a plane at right angles of the shaft so that the pulley 55 is located in the same vertical plane as the wobble box and forwardly thereof. The belt 54 from the pulley 55 passes over a pair of idler pulleys 57 and 58 each of which is mounted on a support bracket 59, 60 carried on the wobble box. One of the idler pulleys, preferably the front pulley, is free to pivot under control of a spring 61 so that the idler pulleys take up the tension in the belt and to hold that tension while accommodating changes in length between the pulley 55 and the wobble box due to movement of the arms 35 and the bar 33 in the vertical direction.

As shown in FIG. 2, the second cutter knife is shown in a stored position rearwardly of the frame and upwardly of the bottom edge of the pan 19. In this position the header can be lowered onto the ground so that the forward portion of the pan 19 lies on the ground. It will be noted that a horizontal line extending rearwardly from the forward portion of the pan 19 extends approximately through or just underneath the sickle knife 30 parallel to the bar 33 so that the whole of the structure can be received on the ground without applying excessive force to the bar 33.

In operation when the header is raised from the ground by the feeder housing 14, the weight of the sickle knife and its associated elements is greater than the tension in the spring 44 so that the bar 33 and the sickle knife are suspended downwardly underneath the pan 19 and rearwardly of the pan 19 in a cutting action. The amount of suspension depends upon the length of the chain 49 and this can be controlled simply by varying the length of the chain so that the height of cut of the second cutter knife relative to the ground and relative to the first cutter knife can be controlled by the operator. The header is then moved across the ground in conventional action and the height of the first cutting knife is arranged relative to the ground so as to cut from the standing crop only a sufficient length to provide efficient operation of the combine harvester. The remaining standing stubble passes underneath the header and engages the pan 19. The standing stubble then encounters the transverse sickle knife 30 which acts to cut a top straw portion from the standing stubble leaving a lowermost portion in contact with the ground and an upper portion which is cut away and dropped rearwardly over the knife onto the ground behind the knife. The positioning of the knife behind the header allows the straw to drop simply from the knife without any blockages or material on top of the knife. The bending of the support arms upwardly and over the knife again prevents any material from being blocked by the support arms and collecting in that area. The straw cut by the second knife thus does not enter the header for transport into the combine body.

If required, the operator can cover some of the guards of the second knife to leave some rows of uncut stubble to act as snow traps.

The farmer can therefore select the required heights of the straw to provide the most efficient operation while preventing any excessive length of stubble left in the field which will interfere with later cultivation.

The elements including the support arms, the springs and the transverse bar supporting the second cutter knife can be readily attached as an accessory to an existing header. The drive system using the simple direct belt drive from the existing shaft 26 of the header again provides a simple attachment of the second cutter to the header which does not interfere with the operation of the header or consume excessive power. The mounting of the system in the location behind the header allows the header to be placed on the ground and removed from the feeder housing in conventional manner without interfering with the resting of the header on the ground.

Although illustrated with an auger header, it is also possible that the cutter can be used with a draper header, in which case the arms can be straight. The number of arms can be varied in dependence upon the length of the header.

*The invention can also be used with the other conventional type of combine harvester mentioned previously here in which is of the type including a stripper header. Combine harvesters of this types are well known and are widely used in many places but are not common in USA.*

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combine harvester comprising a combine body mounted on ground wheels for transportation across the ground, a header at a forward end of the combine body for cutting a standing crop, a feeder housing for supporting the header and for transporting cut crop from the header to the combine body, a first cutter knife across the forward edge of the header and having a length substantially equal to the width of the header for cutting the crop at a position spaced from the ground and along the length of the crop stem leaving a stand crop stem, transport means for transporting the cut crop along the header to the feeder housing, a second cutter knife means having a length substantially equal to that of the first cutter knife and means mounting the second cutter knife means on the header at a position rearwardly of and downwardly of the first cutter knife for cutting the standing crop stem, the second cutter knife means being arranged such that the portion of crop stem cut thereby is released to the ground without engaging the transport means, said mounting means including a plurality of support arms each having a forward end pivotally mounted on the header with the second cutter knife means being mounted at a rearward end of the support arms such that the second cutter knife means is movable vertically by pivotal movement of the forward end of the support arms about a horizontal axis on the header and suspension means providing spring suspension of the second cutter knife means from the header.

2. The combine harvester according to claim 1 wherein the second cutter knife means is arranged rearwardly of the transport means.

3. The combine harvester according to claim 1 wherein the header includes bottom surface means and wherein the second cutter knife means is arranged rearwardly of the bottom surface means.

4. The combine harvester according to claim 1 wherein the header includes a frame having a main top beam and frame elements extending downwardly therefrom and wherein the suspension means is attached to the frame.

5. The combine harvester according to claim 4 wherein the header includes bottom surface means projecting forwardly from the frame to the first cutter knife and wherein the second cutter knife means is arranged rearwardly of the bottom surface means.

6. The combine harvester according to claim 5 wherein the second cutter knife means includes support means received in an area rearwardly of the bottom surface means and wherein at least a portion thereof positioned above a bottom edge of the bottom surface means.

7. The combine harvester according to claim 1 wherein the forward end of the support arms is connected to the header at a position closely adjacent the first cutter knife.

8. The combine harvester according to claim 1 wherein the support arms are spaced along the length of the second cutter knife means and are spaced inwardly from ends of the second cutter knife means.

9. A combine harvester comprising a combine body mounted on ground wheels for transportation across the ground, a header at a forward end of the combine body for cutting a standing crop, a feeder housing for supporting the header and for transporting cut crop from the header to the combine body, a first cutter knife across the forward edge of the header and having a length substantially equal to the width of the header for cutting the crop at a position spaced from the ground and along the length of the crop stem leaving a stand crop stem, transport means for transporting the cut crop along the header to the feeder housing, a second cutter knife means having a length substantially equal to that of the first cutter knife and means mounting the second cutter knife means on the header at a position rearwardly of and downwardly of the first cutter knife for cutting the standing crop stem, the second cutter knife means being arranged such that the portion of crop stem cut thereby is released to the ground without engaging the transport means, said mounting means including a plurality of support arms each having a forward end pivotally mounted on the header with the second cutter knife means being mounted at a rearward end of the support arms such that the second cutter knife means is movable vertically by pivotal movement of the forward end of the support arms about a horizontal axis on the header and suspension means providing spring suspension of the second cutter knife means from the header, the suspension means including tension spring means extending between a frame of the header and the support arms for providing upward spring suspension on the second cutter knife means in a vertical floating movement.

10. The combine harvester according to claim 9 including flexible tether means connected between support arms and the frame of the header for limiting downward movement of the support arms.

11. A combine harvester comprising a combine body mounted on ground wheels for transportation across the ground, a header at a forward end of the combine body for cutting a standing crop, a feeder housing for supporting the header and for transporting cut crop from the header to the combine body, a first cutter knife across the forward edge of the header and having a length substantially equal to the width of the header for cutting the crop at a position spaced from the ground and along the length of the crop stem leaving a stand crop stem, transport means for transporting the cut crop along the header to the feeder housing, a second cutter knife means having a length substantially equal to that of the first cutter knife, means mounting the second cutter knife means on the header at a position rearwardly of and downwardly of the first cutter knife for cutting the standing crop stem, the second cutter knife means being arranged such that the portion of crop stem cut thereby is released to the ground without engaging the transport means, the header including a frame having a main top beam and frame elements extending downwardly therefrom and drive means for driving the second cutter knife means including a pulley mounted on a horizontal shaft of the header rearwardly of the frame and means for communicating drive from the pulley to a knife drive wobble box.

12. The combine harvester according to claim 11 including a drive belt extending from the pulley to the knife drive wobble box, the drive belt being mounted in a plane generally at right angles to the length of the second cutter knife means and including idler pulley means movable to accommodate changes in distance between the pulley and the knife drive wobble box caused by vertical movement of the second cutter knife means relative to the frame.

13. The combine harvester according to claim 12 wherein the belt and knife drive wobble box are arranged at a position spaced inwardly from one end of the second cutter knife means.

*14. A combine harvester comprising:*

*a combine body mounted on ground wheels for transportation across the ground;*

*a header at a forward end of the combine body;*

*the header including a cropping device for removing an upper crop portion from a standing crop leaving a standing crop stem and transport means for transporting the upper crop portion along the header;*

*a feeder housing for supporting the header, for receiving the upper crop portion from the header and for transporting the upper crop portion from the header to the combine body;*

*cutter knife means having a length substantially equal to a width of the header;*

*and means mounting the cutter knife means on the header at a position rearwardly of the header and downwardly of a top of the standing crop stem for cutting the standing crop stem;*

*the cutter knife means being arranged such that a portion of the crop stem cut thereby is released to the ground without engaging the transport means;*

*said mounting means including a plurality of support arms each having a forward end pivotally mounted on the header with the cutter knife means being mounted at a rearward end of the support arms such that the cutter knife means is movable vertically by pivotal movement of the forward end of the support arms about a horizontal axis on the header.*

*15. The combine harvester according to claim 14 wherein the mounting means includes suspension means between the cutter knife means and the header allowing said vertical movement.*

*16. The combine harvester according to claim 15 wherein the suspension means includes spring means providing spring suspension of the cutter knife means from the header.*

*17. The combine harvester according to claim 14 wherein the cutter knife means is arranged rearwardly of the transport means.*

*18. The combine harvester according to claim 14 wherein the header includes bottom surface means and wherein the cutter knife means is arranged rearwardly of the bottom surface means.*

*19. The combine harvester according to claim 15 wherein the header includes a frame having a main top beam and frame elements extending downwardly therefrom and wherein the suspension means is attached to the frame.*

*20. The combine harvester according to claim 19 wherein the header includes bottom surface means projecting forwardly from the frame and wherein the cutter knife means is arranged rearwardly of the bottom surface means.*

*21. The combine harvester according to claim 20 wherein the cutter knife means includes support means received in an area rearwardly of the bottom surface means and wherein at least a portion thereof is positioned above a bottom edge of the bottom surface means.*

*22. The combine harvester according to claim 14 wherein the support arms are spaced along the length of the cutter knife means and are spaced inwardly from ends of the cutter knife means.*

*23. The combine harvester according to claim 15 wherein the suspension means includes means extending between a frame of the header and the support arms for providing upward spring suspension on the cutter knife means in a vertical floating movement.*

*24. The combine harvester according to claim 23 including flexible tether means connected between support arms and the frame of the header for limiting downward movement of the support arms.*

*25. A combine harvester comprising:*

*a combine body mounted on ground wheels for transportation across the ground;*

*a header at a forward end of the combine body;*

*the header including a cropping device for removing an upper crop portion from a standing crop leaving a standing crop stem and transport means for transporting the upper crop portion along the header;*

*a feeder housing for supporting the header, for receiving the upper crop portion from the header and for transporting the upper crop portion from the header to the combine body;*

*cutter knife means having a length substantially equal to a width of the header;*

*and means mounting the cutter knife means on the header at a position rearwardly of the header and downwardly of a top of the standing crop stem for cutting the standing crop stem;*

*the cutter knife means being arranged such that the portion of crop stem cut thereby is released to the ground without engaging the transport means;*

*the header further including a frame having a main top beam and frame elements extending downwardly therefrom and drive means for driving the cutter knife means including a pulley mounted on a horizontal shaft of the header rearwardly of the frame and means for communicating drive from the pulley to a knife drive wobble box.*

*26. The combine harvester according to claim 25 including a drive belt extending from the pulley to the knife drive wobble box, the drive belt being mounted in a plane generally at right angles to the length of the cutter knife means and including idler pulley means movable to accommodate changes in distance between the pulley and the knife drive wobble box caused by vertical movement of the cutter knife means relative to the frame.*

*27. The combine harvester according to claim 26 wherein the belt and knife drive wobble box are arranged at a position spaced inwardly from one end of the cutter knife means.*

* * * * *